Feb. 1, 1938.   H. L. CHISHOLM, JR   2,106,886
STABILIZER STRUCTURE FOR AUTOMOBILES
Filed Feb. 12, 1936   3 Sheets-Sheet 1
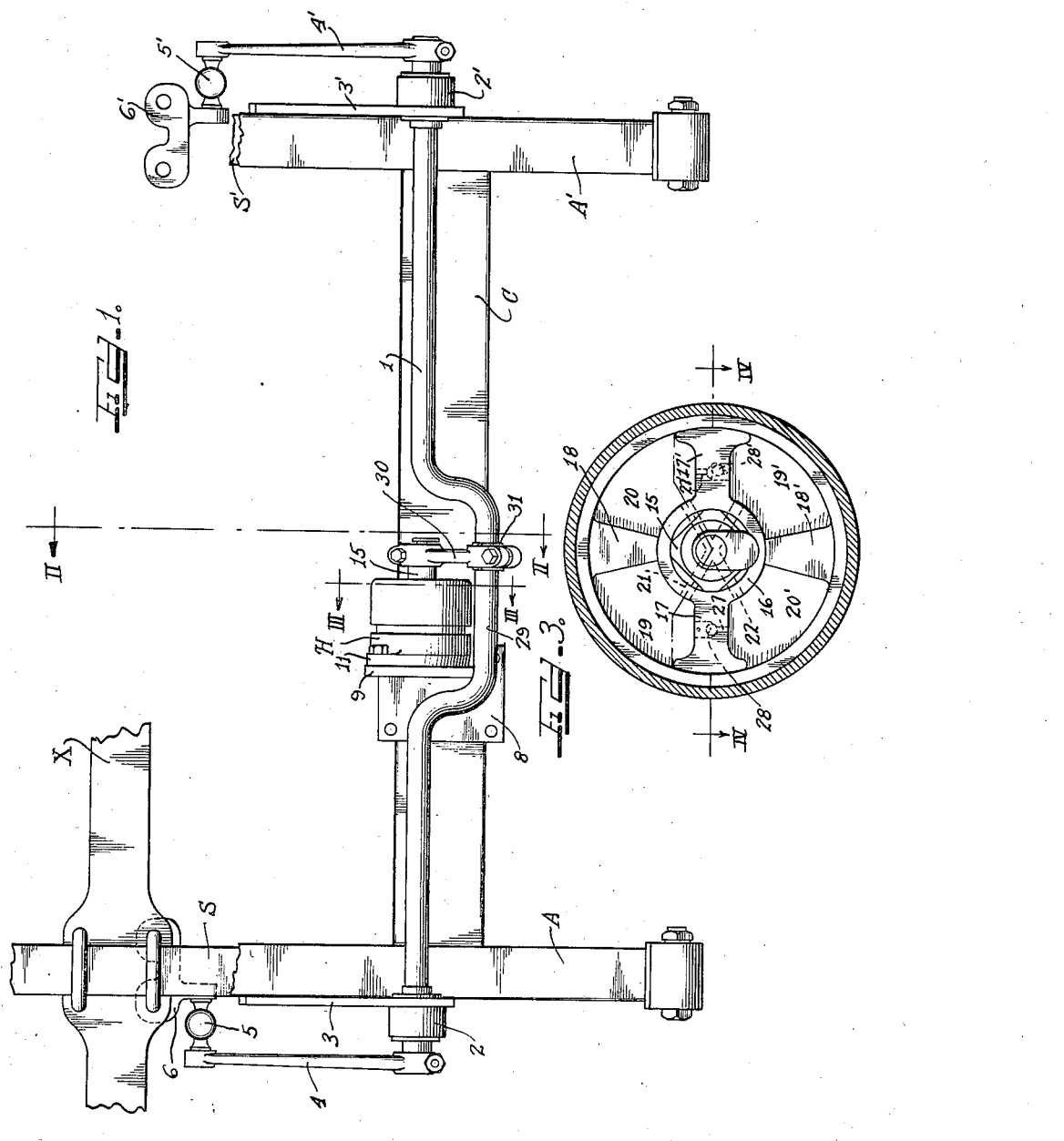
Inventor
Harry L. Chisholm, Jr.
by Charles H. Hills Attys.

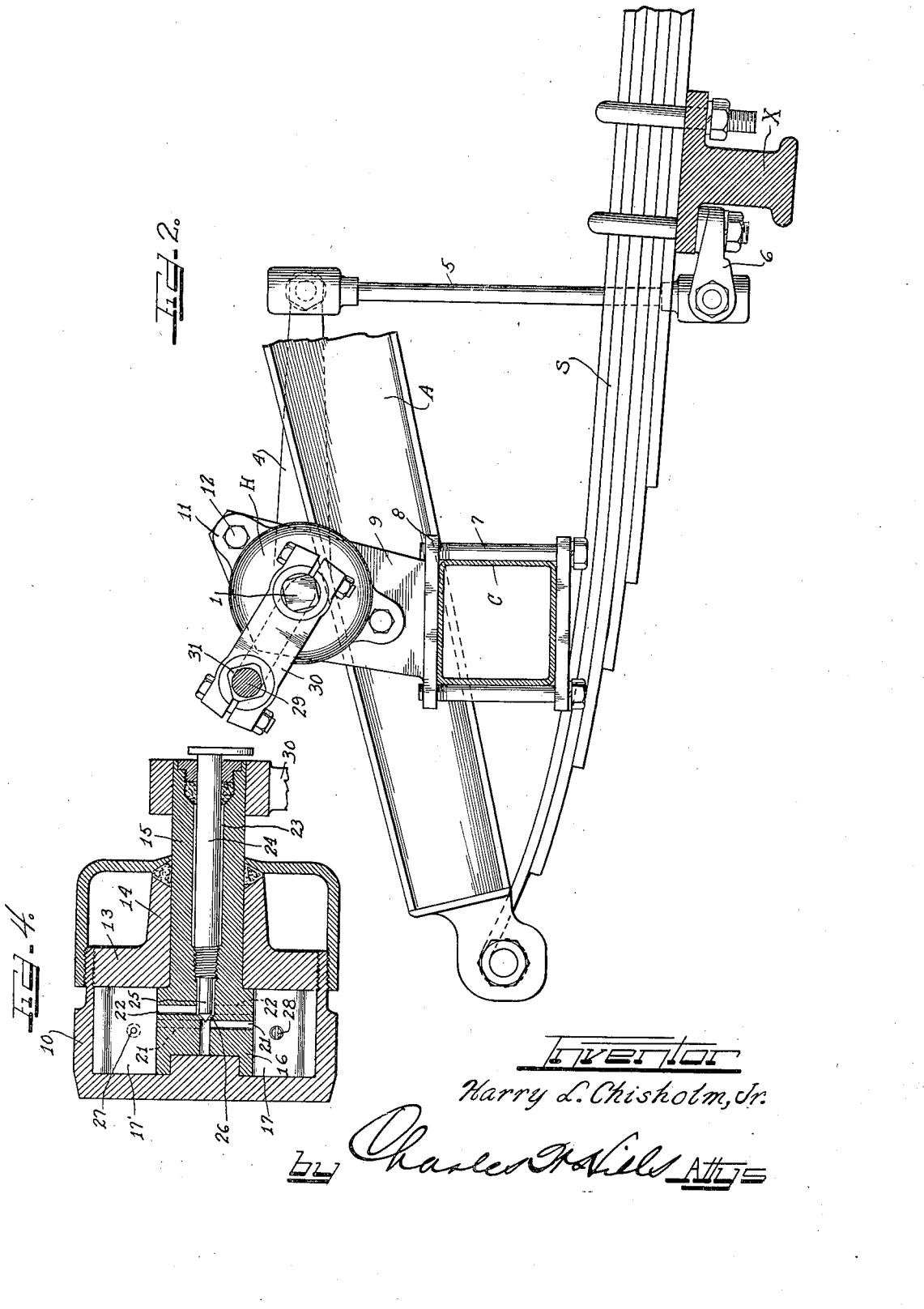

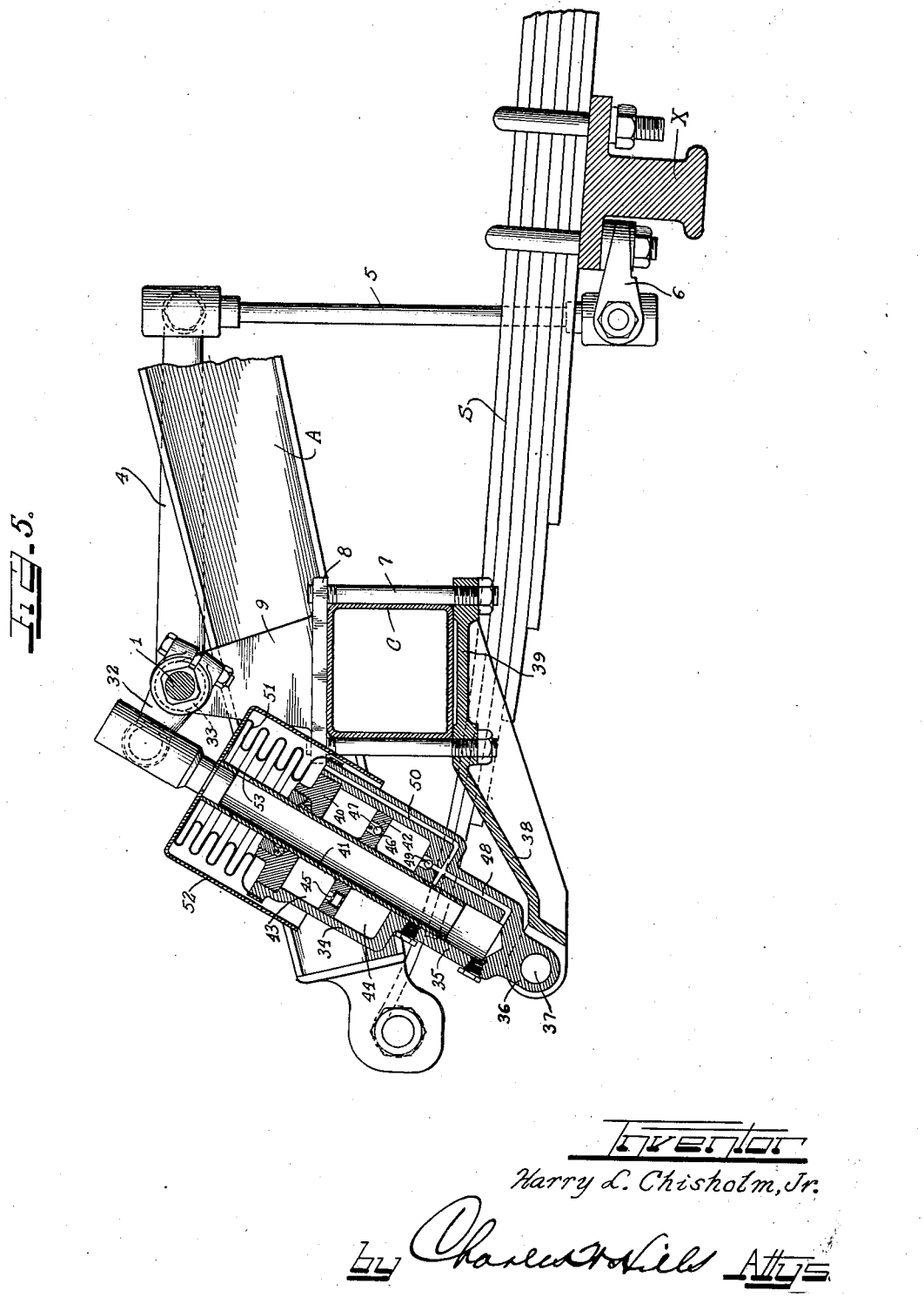

Patented Feb. 1, 1938

2,106,886

UNITED STATES PATENT OFFICE 2,106,886

STABILIZER STRUCTURE FOR AUTOMOBILES

Harry L. Chisholm, Jr., Buffalo, N. Y., assignor to Houde Engineering Corporation, Buffalo, N. Y., a corporation of New York Application February 12, 1936, Serial No. 63,495

3 Claims. (Cl. 267—11)

My invention relates to stabilizer structure adapted particularly for use on automotive vehicles for reducing to a minimum side rocking or careening of the vehicle body when the vehicle rapidly changes its direction of travel, and to stabilize the vehicle body against side rocking or listing when the wheels on one side encounter obstacles or ruts different in magnitude from those encountered by the wheels on the opposite side.

An important object of the invention is to provide a stabilizer structure comprising a torque or torsion rod extending across and journaled at its ends on the vehicle chassis and having its ends connected with the vehicle axle at the respective sides of the chassis, and a hydraulic shock absorber mounted on the chassis and having its piston shaft connected with the torsion rod so that torsional or rotational movement of the rod will be communicated to the shock absorber piston structure for hydraulic control of the rod movement.

A further important object of the invention is to provide an arrangement in which the torsion rod is provided with a crank element connected with the shock absorber piston shaft so that torsional or rotary movement of the bar will be controlled by the shock absorber.

Still another object is to provide an arrangement in which the control of the flow of the displaced fluid in the hydraulic shock absorber is such that the torque bar may rotate more freely in one direction than in the other, with the greatest hydraulic retarding effort effective during return of rebound movement of the vehicle springs and the bar.

The various features of the invention are incorporated in the structure shown on the drawings, in which drawings:

Figure 1 is a plan view of the front part of a vehicle chassis with one form of my improved stabilizer structure applied thereto;

Figure 2 is an enlarged section on plane II—II of Figure 1;

Figure 3 is an enlarged section on plane III—III of the shock absorber;

Figure 4 is a section on plane IV—IV of Figure 3; and

Figure 5 is a view similar to Figure 2 showing a modified arrangement.

As shown on the drawings the ends of the chassis sills A and A' are supported on semi-elliptic vehicle springs S and S' which are clamped to the axle X. Toward their ends, the chassis sills are connected by a cross member C which may be in the form of a rectangular tubular beam. Above the beam and the chassis sills extends the torque or torsion bar 1 which is journaled at its ends in bearing hubs 2 and 2' respectively extending from supporting plates 3 and 3' secured to the sills against the outer side thereof. Secured to the end of the bar outside of the sill A is a lever 4 which extends rearwardly and is connected by a link 5 with a suitable bracket 6 secured to the axle. The opposite end of the bar has a similar connection with the axle, including the lever 4' secured to the bar, the link 5' and the bracket 6'.

Secured on the cross beam C, as by means of clamping bolts 7, is a bracket structure 8 whose upstanding wall 9, in the arrangement shown in Figures 1 to 4, provides a support for the hydraulic shock absorber H. The shock absorber shown is of the so-called hydraulic rotary type. Briefly describing the shock absorber it comprises a cylindrical housing cup 10 from whose base extend ears 11 by means of which it may be secured to the bracket wall 9 as by means of bolts or screws 12. The body 10 has the cover structure 13 which, with its extension 14, forms a bearing for the shaft 15 extending from the piston hub 16 from which extend piston vanes 17 and 17', the hub and vanes, together with the partition structure 18 and 18' within the body 10, defining high pressure hydraulic working chambers 19 and 19' and low pressure hydraulic working chambers 20 and 20', the high pressure chambers being connected together by a radial passageway 21 through the hub 16 and the low pressure chambers being connected together by a passageway 22 through the hub. The piston shaft has a bore 23 through which extends the valve stem 24 which has threaded engagement with the shaft bore and at its inner end terminates in a needle valve 25, or other suitable valve, the valve cooperating with a valve port 26 interposed between the passages 21 and 22 connecting respectively the high pressure working chambers and the low pressure working chambers, this valve controlling particularly the resistance to the flow of the displaced fluid from the high pressure working chambers to the low pressure working chambers. Comparatively low resistance pasasgeways 27 and 27' are provided through the vanes 17 and 17' respectively and controlled by check valves 28 and 28' respectively, the check valves opening the passageways for flow of displaced fluid from the low pressure working chambers to the high pressure working chambers but closing the passageways against flow in the opposite direction so that all of the flow from the high pressure working chambers to the low pressure working chambers must be through the valve port 26 whose resistance to fluid flow is determined by the setting of the valve 25.

In order that rotary or torsional movement of the torque bar 1 may be most efficiently transmitted to the hydraulic shock absorber, the shock absorber is mounted with the axial line of the piston shaft coincident with the axial line of the bar, and in order that the bar may clear the shock absorber body it has the generally U-shaped deflection 29 to provide a crank lever part, and between this lever part and the shock absorber shaft extends the transmission link 30 which is rigidly secured to the lever part and the outer end of the shock absorber shaft. Where the bar 11 is of round stock, the portion of the bar which receives the link 30 may have a polygonal collar 31 secured thereto, or may be shaped to provide a polygonal surface around which the end of the link may be clamped so as to rigidly secure the link to the bar.

The operation of the stabilizer structure is apparent. For example, should the wheel at the left end of the axle strike an obstruction causing the end of the axle to be raised, the link 5' will be correspondingly raised and the lever 4' will be swung upwardly for counter clockwise rotation of the bar 1 (Fig. 2), and the lever 4 at the other end of the bar will also be swung upwardly to exert pull on the link 5 and an upward pull on the corresponding end of the axle, and therefore the tendency will be to keep the vehicle body level and prevent tilting thereof. As both vehicle springs start their rebound movement, the arms 4 and 4' will be swung for clockwise rotation of the torque bar and such rotation of the bar is transmitted by the link 30 to the shock absorber shaft for clockwise rotation of the piston structure for displacement of the hydraulic fluid from the high pressure working chambers 19 and 19' to the low pressure working chambers 20 and 20' by way of the port 26 restricted by the valve 25 and the rebound movement of the springs and of the bar will be retarded and checked, and shocks to the vehicle body will be prevented. During compression movement of the vehicle springs and counter clockwise rotation of the torque bar, the lesser resistance passages 27 and 27' will be opened to the fluid flow from the low pressure working chambers to the high pressure working chambers and the compression movement of the vehicle springs is therefore freer than the rebound movement thereof.

Should the vehicle suddenly change its direction of travel, as by rapidly turning a corner, the vehicle body will tend to tilt or careen. Such tilting is resisted by the torque bar connection and also by the shock absorber, and the recoil or rebound movement will be retarded and absorbed.

In the modified arrangement shown on Figure 5 a direct acting piston type of shock absorber is associated with the torsion bar 1, and instead of offsetting or deflecting the bar to provide a lever part for connection with the shock absorber, a lever 32 is rigidly clamped to the bar. The vertical wall 9 of the bracket 8 on the cross beam C may then support a bearing 33 for the bar at the middle thereof.

Briefly describing the shock absorber shown, it comprises a cylinder 34 having the reduced extension 35 terminating in an eye 36 which, in the arrangement shown, receives a pivot pin 37 supported at the end of an arm 38 secured to the cross beam C. As shown the arm forms an extension on the clamping plate 39 which is clamped against the bottom of the cross beam by the screws 7 which clamp bracket 8 to the top of the cross beam, the arm 38 extending forwardly and downwardly.

The cover 40 for the cylinder and the extension 35 journal a tubular piston rod 41 carrying the piston 42, the outer end of the piston rod structure being connected in any suitable manner to the end of the crank or lever arm 32 on the torsion rod 1 so that as the rod is rotated during running of the vehicle, the piston structure will reciprocate in the cylinder between the high pressure working chamber 43 and the low pressure working chamber 44. The displaced fluid flow from the high pressure chamber to the low pressure chamber takes place during rebound or recoil movement of the vehicle springs and the torsion bar and is metered by the restricted orifice 45 which is preferably of the sharp edge type so that the fluid flow will be uninfluenced by variations in viscosity.

The displaced fluid flow from the low pressure working chamber to the high pressure working chamber is through a comparatively low resistance passageway 46 in the piston, this passageway being closed by a check valve 47 against flow from the high pressure chamber to the low pressure chamber.

In the shock absorber shown the hollow piston tube and the extension 35 may serve as a reservoir for hydraulic fluid which is fed to the hydraulic working chambers through the passageway 48 under control of the check valve 49. The passageway 48 is connected by the passageway 50 with the interior of a bellows 51 extending between the top of the cylinder and a dust cap or shield 52 secured to the upper end of the piston rod structure, and a pressure balancing port 53 is provided at the upper end of the piston rod structure tube.

I have thus provided simple and efficient stabilizing structure which will prevent material tilting or swaying of the vehicle, absorb the shocks, and assure easy riding.

I have shown a practical and efficient embodiment of the various features of my invention but I do not desire to be limited to the exact construction, arrangement, and operation shown and described as changes and modifications may be made without departing from the scope of the invention.

I claim as follows:

1. In stabilizing structure for automotive vehicles, an integral torque bar extending across and journaled at its ends on the vehicle chassis, levers connecting the ends of said bar with the vehicle axle structure, said bar intermediate its ends having an offset portion, a hydraulic shock absorber of the rotary type mounted on said chassis within said offset portion of the bar and with its axial line coincident with the axial line of rotation of said bar, and a connection from said offset portion for transmitting the rotary movement of said bar to the shock absorber rotary element.

2. In stabilizing structure for an automotive vehicle, an integral torque bar, cooperating lever arms and links connecting said bars to the vehicle axle means, bearings on the vehicle chassis for the ends of said bar, said bar having an offset portion, a hydraulic shock absorber of the rotary type supported by the vehicle chassis at said offset portion of the bar and with the axial line of the shock absorber rotor element coincident with the axial line of rotation of said bar, a link rigidly connected to the offset portion of said bar and the shock absorber rotor element, said shock absorber being adjusted to lightly dampen spring compression and to heavily dampen spring reaction.

3. A stabilizing structure for automotive vehicles comprising a torque bar extending across the vehicle chassis and journaled at the sides thereof, lever and link connections between the ends of said bar and the respective ends of the vehicle axle structure, said bar having a generally U-shaped crank forming offset portion, a hydraulic shock absorber of the rotary type mounted on the vehicle chassis at said bar offset portion and with the axis of rotation of its rotor coincident with the axis of rotation of said bar, and a link rigidly secured to said offset portion and to the shock absorber rotor element whereby movement of said bar may be hydraulically controlled by said shock absorber.

HARRY L. CHISHOLM, Jr.